Jan. 30, 1962  P. E. LAPAT ETAL  3,019,139
CHEMICAL PROCESS AND PRODUCT FORMED
Filed Dec. 2, 1960
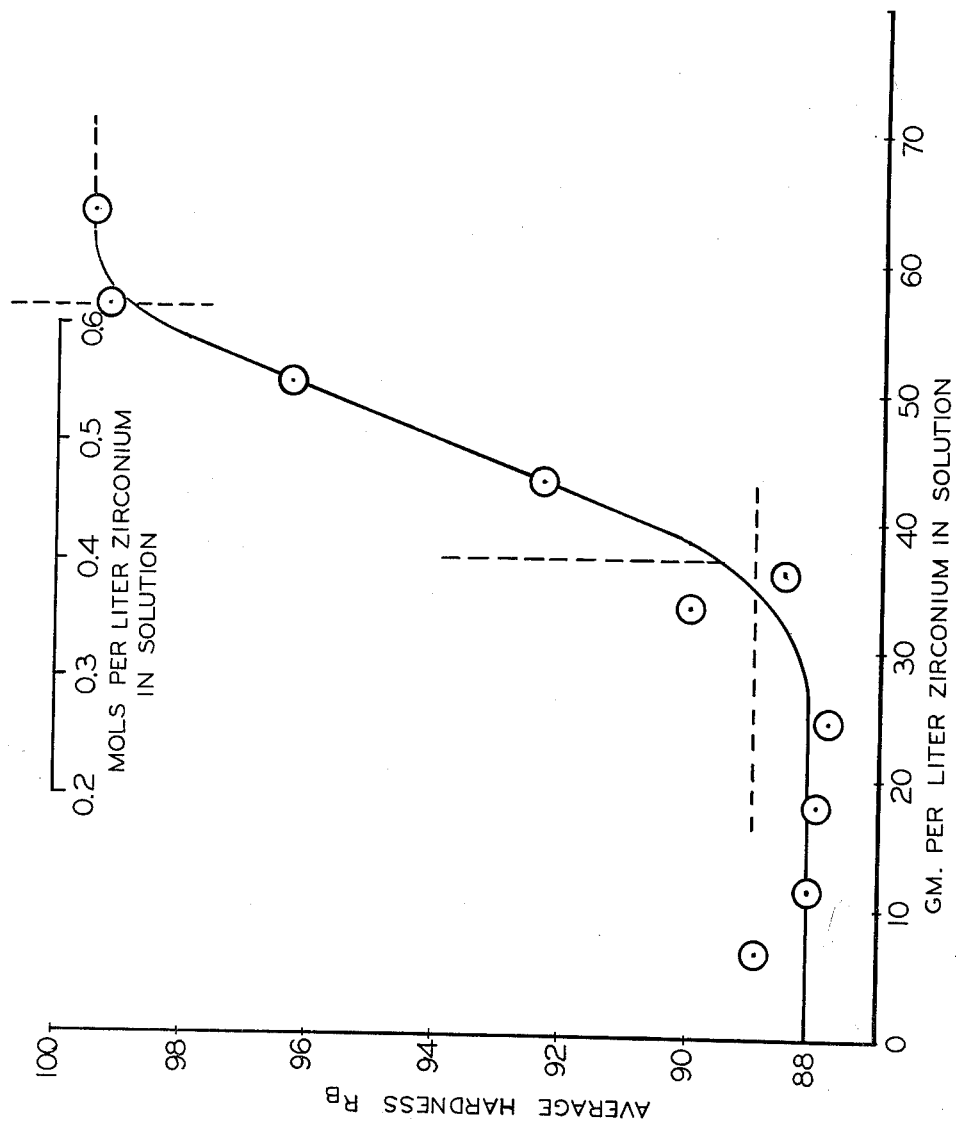
INVENTORS.
PHILIP E. LAPAT
EMANUEL GORDON
ROBERT B. HOLDEN
BY Paul E. Rochford

United States Patent Office 3,019,139
Patented Jan. 30, 1962

3,019,139
CHEMICAL PROCESS AND PRODUCT FORMED
Philip E. Lapat and Emanuel Gordon, New Haven, and Robert B. Holden, Orange, Conn., assignors, by mesne assignments, to United Nuclear Corporation, New Haven, Conn., a corporation of Delaware
Filed Dec. 2, 1960, Ser. No. 73,410
4 Claims. (Cl. 134—28)

The subject invention relates to a method for reducing the quantity of certain valuable metals which become unrecoverable waste as a result of fabrication. More particularly, it relates to a method of recovering metal values from scrap metal produced in the fabrication, as by machining, of metal specimens composed predominately of titanium, hafnium, or zirconium, and alloys thereof.

In recent years, certain metals which had previously been considered laboratory curiosities, or which had been produced and used to a very limited extent, have been used on an increasingly larger scale. Such metals, for example as titanium, have been used extensively in the aircraft and rocket field. Zirconium has been used because of its resistance to corrosion, as for example its resistance to reaction with dilute hydrochloric acid and to alkaline solutions. It also has been employed in surgical applications and in the manufacture of flash bulbs.

As a result of the increased utilizations of these metals, increased quanties of scrap metal such as machining scrap have been generated. Methods for recovery of the metal values of scrap have been uneconomical or inadequate and much valuable metal in the form of scrap, particularly that in the form of chips produced in machining metal parts has not been recovered due to a lack of a suitable process for such recovery.

When the scrap exists in the form of fine turnings or chips, it has been difficult to store because of the pyrophoric properties of certain metals.

Several attemps at reclamation have been made using a three-step process as follows:

(1) Removal of grease, cutting-oils and physically adherent contamination by means of solvent washing.

(2) Chemical removal of an oxidized surface layer of metal by pickling in solutions containing such reagents as mixed hydrofluoric and nitric acids.

(3) Compaction and arc-melting of the purified chips.

Some of this work at first appeared to be successful on a laboratory scale but attempts to scale up the process failed. In one case, during the treatment of 100 pound batches of machine chips, the presence of a white gelatinous precipitate was observed in the pickling vat. The precipitate was formed even before it became necessary to regenerate the pickling solution and it continued to deposit after regeneration. Simple washing would not dislodge the precipitate completely from the chips and no solutions could be found to dissolve it. The presence of this precipitate was found to contribute to ingot hardness and porosity, making the metal essentially worthless. The precipitate was tentatively identified as $ZrOF_2 \cdot XH_2O$.

A second, similar attempt at using $HF-HNO_3$ pickling solutions also produced a zirconium oxyfluoride which coagulated on the ridges and valleys of the chips. During melting, this oxyfluoride dissociated to form zirconium oxide which entered the melt. The hardness of the resulting ingot was found to be definitely dependent on the oxygen contamination so introduced.

In view of the failure either to prevent the precipitation of oxygen-bearing zirconium salts during pickling or to re-dissolve or separate such precipitates in the cases where they did form, the entire concept of acid pickling was largely abandoned in favor of other approaches such as calcium gettering.

One object of this invention is to provide a method of recovering metal values from the scrap of certain metals. Another object is to provide a method which permits control of the quality of metal produced from scrap metal. A further object is to provide an economical method of avoiding the presence of certain undesirable impurities in recovered scrap metal.

Other objects will be in part apparent and in part pointed out in the description which follows.

In one of its broader aspects the objects of this invention are achieved by surface cleaning the metal scrap and then pickling the cleaned scrap with nitric and hydrofluoric acids under such conditions as avoid the formation of insoluble fluoride-containing precipitates, and then melting the pickled metal to form purified metal ingot.

The pickling of scrap in accordance with this method may be carried out in conjunction with other scrap treatment steps. For example, the method may be employed in conjunction with the treatment procedures described in the copending application for patent S.N. 773,545, filed November 5, 1958, now abandoned. In particular the pickling procedure may be employed in increasing the purity of those size fractions of chips which have the highest impurity content. As is evident from the copending application, it has now been discovered that the impurity content of scrap in a relatively finely divided form such as chips is directly related to the size fractions into which such scrap may be separated in accordance with the procedures described therein.

Where the fractions of particles of high impurity level are found to be relatively large, in the order of 25% or more, or where the volume of such scrap is very large, it becomes increasingly important to recover the metal contained in this higher impurity material. Similarly, where the entire body of scrap material is found to contain impurities at a concentration or of particular nature, the procedures taught in the copending application S.N. 773,545 may be found to yield a treated product which is only partially improved in purity. It has now been found that substantial improvements in removal of impurities from such scrap can be made at relatively low cost, by combining the specialized cleaning procedures described in the copending application with the novel pickling procedures described herein.

Contrary to the findings of the earlier workers, we have now discovered a means by which zirconium alloy chips can be pickled in acid without the undesirable precipitation of these oxygen-bearing salts.

We have found that it is possible to prevent the precipitation of such salts by operating the process within well-defined limits relating to the concentrations of nitric and of hydrofluoric acids, temperature, and concentration of zirconium.

Firstly, the concentration of hydrofluoric acid should not be greater than about 0.5 M because otherwise the pickling rate will be too rapid for uniform penetration of the chips and for convenient control of reaction time. A desirable pickling rate for continual large scale operations may be maintained by maintaining the HF concentration between about 0.1 M and 0.5 M by continual additions of acid to the pickling bath.

There is a certain amount of latitude in the operating temperature and nitric acid concentrations which are used. However, once values for these are established, there is a critical value beyond which the zirconium concentration must not be permitted to go. During the pickling reaction the zirconium concentration increases continuously. It is therefore essential that this pickling must be stopped in order to prevent the zirconium concentration from going beyond the critical value. Once the permissible zirconium concentration of the solution is determined, one must exercise due care to stop the pickling reaction before this concentration is exceeded.

The approximate concentration values, Z, beyond which the zirconium concentration should not be allowed to go may be represented by the following equation:

$$Z = 0.03T - 0.2C$$

where T is temperature in degrees centigrade and C is the concentration of mineral acid in gram equivalents. While the values provided by this equation are approximate, it is contemplated that a few experiments will enable one skilled in the art to determine the most precise and economic conditions for operation.

It has been found that the rate at which a given metal specimen will dissolve in a solution of mixed acids containing hydrofluoric acid, is almost exclusively dependent on the concentration of hydrofluoric acid in the solution. In order to stop the pickling, the metal is removed from the pickling bath or the acid solution is replaced with water.

With regard to the acid solutions which are used, the hydrofluoric-nitric acid mixtures are preferred because of the ease of handling these compositions in large-scale operations and the excellent results obtained. However, other acid systems such as hydrofluoric-sulfuric, or hydrofluoric-hydrochloric may be used. The acid used with the hydrofluoric acid should be one capable of forming soluble salts of the metal being pickled under the conditions employed. In addition, a solution containing sulfuric acid and a fluoride salt such as ammonium fluoride can be used.

In carrying out the subject method and concentration and temperature values of choice are 1.5 M nitric acid and room temperature (25° C.). Under these circumstances, the pickling bath can be operated satisfactorily when the concentration of dissolved zirconium is in the range 0.0 to 0.4 gm.-mole of zirconium per liter. When this concentration exceeds 0.4 gm.-mole/liter, an unsatisfactory recovered metal product is obtained, and when it reaches about 0.6 gm.-mole/liter, an actual precipitate of a white salt may take place where the composition is at room temperature.

When it is necessary or desirable to operate the bath so as to reach much higher concentrations of zirconium, the temperature may be raised or the concentration of nitric acid may be correspondingly diminished. The difficulty of controlling large scale pickling operations increases with increasing temperature due to an increased rate of pickling and the lower temperature ranges are preferred for this reason. As the temperature is increased above 60° C., the solubility of zirconium does not increase and it is accordingly preferred to employ lower temperatures. The use of room temperature and a hydrofluoric acid concentration of about 0.5 molar are preferred conditions for pickling as they provide a favorable pickling rate without a requirement for heating.

The minimum recommended nitric acid concentration would be zero insofar as increasing zirconium solubility is concerned. However, recovered metal product of better quality is produced by maintaining a minimum of 0.5 M $HNO_3$.

Under no cirmumstance should the $HNO_3$ concentration exceed 3 M, because at such concentrations the zirconium solubility is low. At a concentration of 3 M and a temperature of 25° C., only about 0.15 mol/liter of zirconium can be retained in the solution. At 3 M and 40° C., only 0.6 mole/liter are soluble. By contrast, at 1 M nitric acid and 40° C., the solubility of Zr is about 1.0 moles per liter.

The following examples are illustrative of the method of the subject invention although it will be understood that these examples are given for illustrative purposes only and should therefore not be interpreted as defining the scope of the invention.

In each test, 250 grams of Zircaloy machine chips were treated with 4 liters of mixed acid containing approximately 0.25 mole of HF and 1.5 mole of $HNO_3$. The pickling reaction was permitted to continue until approximately 25 grams of Zr had dissolved. Fresh chips were used in each test, but the same acid bath was used repeatedly. In order to maintain its initial strength, replenishments of HF and $HNO_3$ were made after each test, such that four moles of hydrogen ion were added per mole of zirconium dissolved; and sufficient fluoride (as HF) was added to maintain the original dissolution rate.

The pickled chips were afterward rinsed, dried, compacted and arc melted. The resulting metal was hardness tested.

The following correlation was made between hardness of resultant metal and zirconium content of the solution:

| Test | Gm./l. Zr in Solution at End of Test | Mol./l. Zr in Solution at End of Test | Average Hardness, $R_B$ |
|---|---|---|---|
| HFN-89 | 6.5 | .071 | 88.9 |
| HFN-90 | 11.5 | .126 | 88.1 |
| HFN-91 | 18.0 | .198 | 88.0 |
| HFN-92 | 24.5 | .269 | 87.8 |
| HFN-93 | 33.3 | .365 | 89.8 |
| HFN-94 | 35.8 | .393 | 88.5 |
| HFN-95 | 43.0 | .472 | 92.3 |
| HFN-96 | 50.5 | .553 | 96.3 |
| HFN-97 | 56.3 | .607 | 99.2 |
| HFN-98 | 63.5 | .697 | 99.4 |

Metal having hardness below $R_B$ 89 to 90 is preferred for most purposes and metal above 93 to 95 is considered to be of unsatisfactory quality.

It is seen that the quality of metal melted from pickled chips fell drastically when the pickling operation was conducted outside of the prescribed concentration range, which in this case is 0.4 mol/liter or below. In practicing the subject invention, it is essential to observe that the product quality begins to fall off at zirconium concentrations much lower than those at which an oxyfluoride precipitate can be seen. The concentration ranges within which the method must be practiced are evident from the accompanying figure in which the average hardness of metal formed from recovered metal scrap is platted against the concentration of zirconium in solution.

While the foregoing procedure has been described with reference to specific operations of size classification of particles, pickling, rinsing, drying, and further particle size classification, it will be appreciated that any combination of steps which includes a pickling step according to the procedures and within the combinations of concentrations disclosed above is within the scope of the present invention.

For the operations to be performed in carrying out the methods of this invention conventional unit processing apparatus may be used. One highly desirable capability of any apparatus which is to be used in the wet handling of the finer scrap particles is a capability for rapid and thorough removal of liquid. One reason for this is that scrap in the form of chips retains liquids in the manner of sponges and is difficult to contact uniformly with pickling liquids and to rinse free of pickling liquids in the controlled manner as prescribed above for best results.

One type of apparatus which is particularly well suited to the special requirements of pickling chips in accordance with this invention is a vessel resembling a large tumbling barrel. This barrel-shaped vessel forms the heart of the apparatus and is provided with accessories for tilting from a horizontal to a vertical axis, as well as with means for rotation at two speeds. At a slower speed with the barrel at an inclined axis the chips in the barrel can be rotated as a slurry in the pickling or wash liquids for uniformly good contact. At the faster speed the liquid can be removed by centrifugal force. At least a portion of the barrel wall is formed of wire mesh or perforated plate of suitable dimensions for retaining the chips while passing the liquid.

Occasionally, through accidental or other unavoidable failure to maintain processing conditions within the limits set forth above, the conditions may obtain for the formation of the zirconium, hafnium, or titanium oxy-salt. There are a number of steps which may be taken to avoid the deleterious effects of the formation of the precipitate if this formation has not gone too far.

A procedure, which can be used when the formation of the precipitate has actually been initiated, involves a re-dissolution of the nascent precipitate. This procedure is dependent on increasing the concentration and is most useful for those compositions in which the nitric acid concentration is less than about 3 molar. In accordance with this procedure the nitric acid concentration must be increased to approximately 10 molar if the process is carried out at room temperature, or to 5 molar if the process is carried out at about 50° C. This procedure is dependent on an apparent temporary "solubility" of the precipitate at higher $HNO_3$ concentrations. This concentration step must be followed in short order by a "dilution" step to bring the nitric acid concentration into the range of about 1.5 molar in order to avoid a new precipitation of an insoluble salt. The attainment of chemical equilibrium for the concentrated solution is sufficiently slow so that these manipulations may safely be made without encountering the undesirable precipitation.

As an alternative procedure, where the nitric acid concentration has been in excess of 3 molar and the formation of a precipitate has been initiated, it is possible to re-dissolve the nascent precipitate by diluting the pickling solution. This process has particular utility for high temperature pickling baths and may be carried out by decreasing the nitric acid concentration to a value of below about 2 molar. This alternative procedure is useful only with respect to a nascent precipitate formed at high nitric acid concentration, whereas the first procedure is limited in utility to a re-dissolution of precipitate formed at lower nitric acid concentration.

Since many examples of the foregoing procedures and articles may be carried out and made, and since many modifications can be made in the procedures and articles described without departing from the scope of the subject invention, the foregoing is to be interpreted as illustrative only, and not as defining or limiting the scope of the invention.

We claim:

1. The method of removing impurities from the surface of scrap metal specimens selected from the group consisting of titanium, hafnium, zirconium and alloys thereof which comprises treating a relatively large quantity of said specimens in a pickling bath comprising hydrofluoric acid and another inorganic acid, maintaining the hydrofluoric acid concentration between 0.1 and 0.5 normal, maintaining the other inorganic acid concentration between 0.5 and 8 normal, maintaining the temperature between 20° C. and 60° C. and maintaining the zirconium ion concentration in said bath at values below about 1.6 molar.

2. The method of removing impurities from the surface of scrap metal specimens selected from the group consisting of titanium, hafnium, zirconium and alloys thereof which comprises treating a relatively large quantity of said specimens in a pickling bath comprising hydrofluoric acid and nitric acid, maintaining the hydrofluoric acid concentration between 0.1 and 0.5 normal, maintaining the nitric acid concentration between 0.5 and 8 normal, maintaining the temperature between 20° C. and 60° C. and maintaining the zirconium ion concentration in said bath at values below about 1.6 molar.

3. The method of removing impurities from the surface of scrap metal specimens selected from the group consisting of titanium, hafnium, zirconium and alloys thereof which comprises treating a relatively large quantity of said specimens in a pickling bath containing between 0.1 and 0.5 normal hydrofluoric acid, and maintaining the concentration of metal in said solution below a value, Z, in moles per liter determined by the equation:

$$Z = 0.03T - 0.2C$$

wherein T is a temperature between 20° and 40° C. and, C is a concentration of mineral acid in said bath between 0.5 and 3.0 normal.

4. The method of improving the purity of relatively finely divided scrap metal formed from titanium, hafnium, zirconium, or alloy composed predominantly of at least one of these metals which comprises treating said scrap in a pickling bath comprising hydrofluoric acid and another inorganic acid, maintaining the hydrofluoric acid concentration between 0.1 and 0.5 normal, maintaining the other inorganic acid concentration between 20° C. and 60° C., maintaining the concentration of zirconium iron in said bath at values below about 1.6 molar, rinsing the treated scrap to remove the pickling solution and thereafter separating a fraction of said particles comprising the finest particles of said scrap.

References Cited in the file of this patent

UNITED STATES PATENTS

| | | |
|---|---|---|
| 2,653,134 | Dilling et al. | Sept. 22, 1953 |
| 2,965,521 | Bomberger et al. | Dec. 20, 1960 |